US008228167B2

(12) United States Patent
Maruya et al.

(10) Patent No.: US 8,228,167 B2

(45) Date of Patent: Jul. 24, 2012

(54) ACCESS CONTROL DEVICE

(75) Inventors: Kensuke Maruya, Kanagawa (JP); Takanori Shimada, Tokyo (JP); Susumu Okada, Kanagawa (JP); Tomohide Ishigami, Tokyo (JP)

(73) Assignee: Panasonic Corporation, Osaka (JP)

( * ) Notice: Subject to any disclaimer, the term of this patent is extended or adjusted under 35 U.S.C. 154(b) by 658 days.

(21) Appl. No.: 11/570,075

(22) PCT Filed: Feb. 27, 2006

(86) PCT No.: PCT/JP2006/303626

§ 371 (c)(1), (2), (4) Date: Dec. 6, 2006

(87) PCT Pub. No.: WO2006/095592

PCT Pub. Date: Sep. 14, 2006

(65) Prior Publication Data

US 2009/0172808 A1 Jul. 2, 2009

(30) Foreign Application Priority Data

Mar. 8, 2005 (JP) ................................ 2005-063310

(51) Int. Cl.
*G05B 19/00* (2006.01)

(52) U.S. Cl. ........................................ 340/5.8; 340/5.2

(58) Field of Classification Search .................. 340/5.8, 340/7.35, 5.7, 5.74, 5.21, 5.65, 5.27, 5.2
See application file for complete search history.

(56) References Cited

U.S. PATENT DOCUMENTS

| | | | | |
|---|---|---|---|---|
| 5,416,725 | A * | 5/1995 | Pacheco et al. | 702/176 |
| 5,422,634 | A * | 6/1995 | Okubo | 340/5.24 |
| 5,699,514 | A * | 12/1997 | Durinovic-Johri et al. | 726/19 |
| 6,504,470 | B2 * | 1/2003 | Puchek et al. | 340/5.53 |
| 6,556,127 | B1 * | 4/2003 | Moser et al. | 340/5.84 |
| 7,280,030 | B1 * | 10/2007 | Monaco | 340/5.21 |
| 8,102,238 | B2 * | 1/2012 | Golander et al. | 340/5.2 |
| 2001/0039583 | A1 * | 11/2001 | Nobakht et al. | 709/227 |
| 2002/0070865 | A1 * | 6/2002 | Lancos et al. | 340/573.1 |
| 2002/0147588 | A1 * | 10/2002 | Davis et al. | 704/246 |
| 2003/0034876 | A1 * | 2/2003 | Puchek et al. | 340/5.53 |
| 2004/0160305 | A1 * | 8/2004 | Remenih et al. | 340/5.22 |

(Continued)

FOREIGN PATENT DOCUMENTS

JP 5-263558 10/1993

(Continued)

OTHER PUBLICATIONS

Japanese Office action for JP2005-063310 dated Aug. 3, 2010.

*Primary Examiner* — Albert Wong
*Assistant Examiner* — Rufus Point
(74) *Attorney, Agent, or Firm* — Pearne & Gordon LLP

(57) ABSTRACT

An object of the invention is to provide an access control apparatus for lessening the occasions of invading a place where no entry is permitted without setting any separate access condition for a temporary user of a visitor, etc., in a room entering and leaving management apparatus using personal identification information of an IC card, etc.

The access control apparatus of the invention sets the master-slave relationship between identification information possessed by a guide and identification information possessed by a visitor and automatically sets the access permission of the visitor in response to the verification result of the guide.

5 Claims, 9 Drawing Sheets

U.S. PATENT DOCUMENTS

| | | | | |
|---|---|---|---|---|
| 2005/0001711 | A1* | 1/2005 | Doughty et al. | 340/5.74 |
| 2006/0055507 | A1* | 3/2006 | Minowa | 340/5.1 |
| 2006/0116970 | A1* | 6/2006 | Scherzer et al. | 705/74 |
| 2006/0137026 | A1* | 6/2006 | Serani et al. | 726/27 |
| 2009/0108988 | A1* | 4/2009 | Cleveland et al. | 340/5.52 |

FOREIGN PATENT DOCUMENTS

| | | |
|---|---|---|
| JP | 6-185249 | 7/1994 |
| JP | 11-232514 | 8/1999 |
| JP | 2000-348227 | 12/2000 |
| JP | 2001-005875 | 1/2001 |
| JP | 2004-211381 | 7/2004 |

* cited by examiner

| GATE NUMBER | IDENTIFICATION INFORMATION | ROOM ENTERING FLAG | ROOM LEAVING FLAG | RELATION NUMBER |
|---|---|---|---|---|
| 0 | 1 | OK | OK | |
| 0 | 2 | OK | OK | |
| 0 | 3 | OK | OK | |
| 1 | 1 | OK | OK | |
| 1 | 2 | OK | OK | |

| RELATION NUMBER | MASTER IDENTIFICATION INFORMATION | SLAVE IDENTIFICATION INFORMATION | SETUP GATE NUMBER |
|---|---|---|---|
| 1 | 0 | 10 | 1 |
| 2 | 1 | 12 | 2 |

(FIG. 5 CONTINUED)
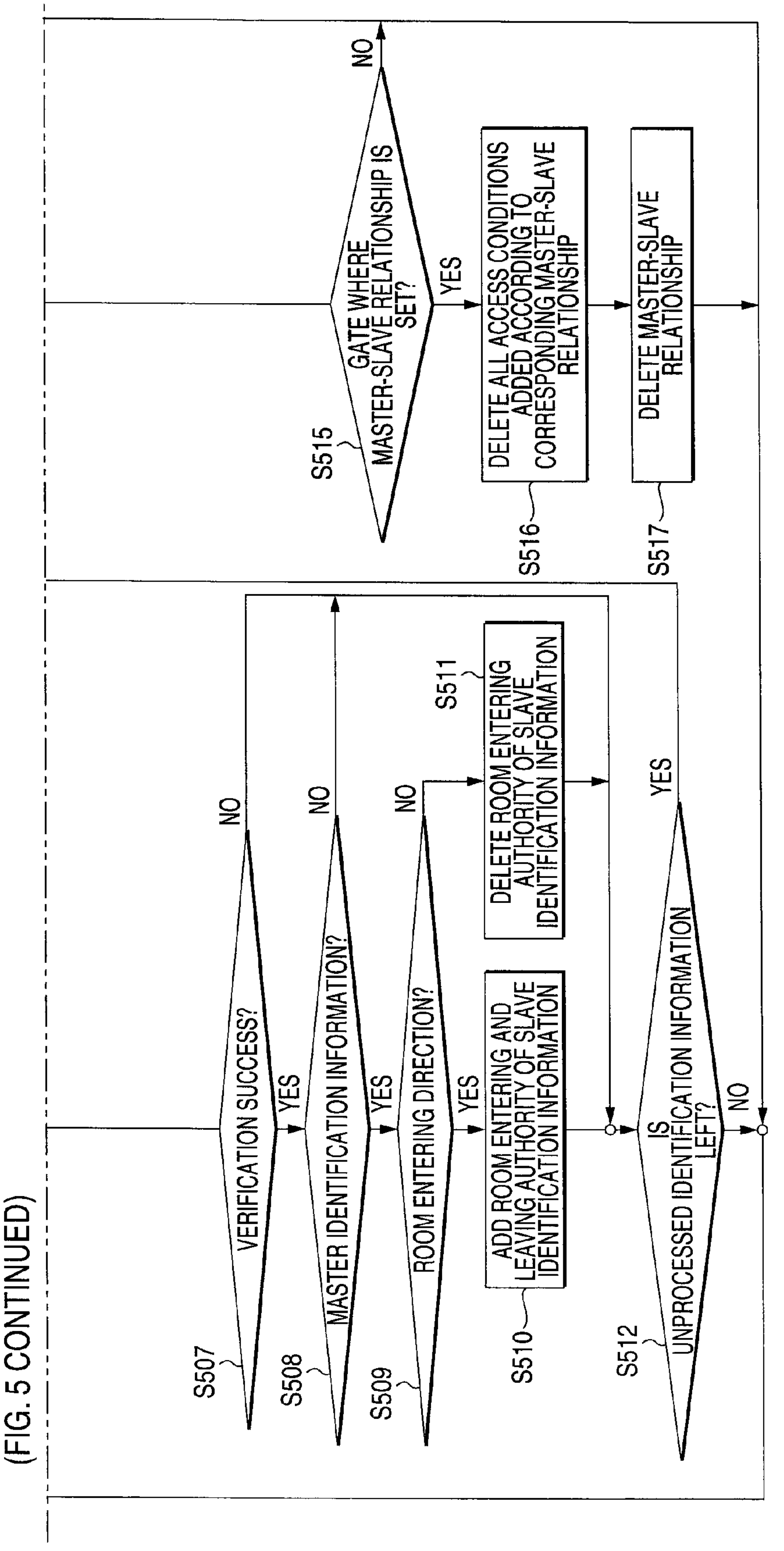

FIG. 6

| RELATION NUMBER | MASTER IDENTIFICATION INFORMATION | SLAVE IDENTIFICATION INFORMATION | SETUP GATE NUMBER |
|---|---|---|---|
| 1 | 1 | 10 | 0 |

FIG. 7

| GATE NUMBER | IDENTIFICATION INFORMATION | ROOM ENTERING FLAG | ROOM LEAVING FLAG | RELATION NUMBER |
|---|---|---|---|---|
| 0 | 1 | OK | OK | |
| 0 | 2 | OK | OK | |
| 0 | 3 | OK | OK | |
| 1 | 1 | OK | OK | |
| 1 | 2 | OK | OK | |
| 0 | 10 | OK | OK | 1 |

FIG. 8

| GATE NUMBER | IDENTIFICATION INFORMATION | ROOM ENTERING FLAG | ROOM LEAVING FLAG | RELATION NUMBER |
|---|---|---|---|---|
| 0 | 1 | OK | OK | |
| 0 | 2 | OK | OK | |
| 0 | 3 | OK | OK | |
| 1 | 1 | OK | OK | |
| 1 | 2 | OK | OK | |
| 0 | 10 | OK | OK | 1 |
| 1 | 10 | OK | OK | 1 |

FIG. 9

| GATE NUMBER | IDENTIFICATION INFORMATION | ROOM ENTERING FLAG | ROOM LEAVING FLAG | RELATION NUMBER |
|---|---|---|---|---|
| 0 | 1 | OK | OK | |
| 0 | 2 | OK | OK | |
| 0 | 3 | OK | OK | |
| 1 | 1 | OK | OK | |
| 1 | 2 | OK | OK | |
| 0 | 10 | OK | OK | 1 |
| 1 | 10 | NG | OK | 1 |

FIG. 10

| GATE NUMBER | IDENTIFICATION INFORMATION | ROOM ENTERING FLAG | ROOM LEAVING FLAG | RELATION NUMBER |
|---|---|---|---|---|
| 0 | 1 | OK | OK | |
| 0 | 2 | OK | OK | |
| 0 | 3 | OK | OK | |
| 1 | 1 | OK | OK | |
| 1 | 2 | OK | OK | |

(FIG. 11 CONTINUED)
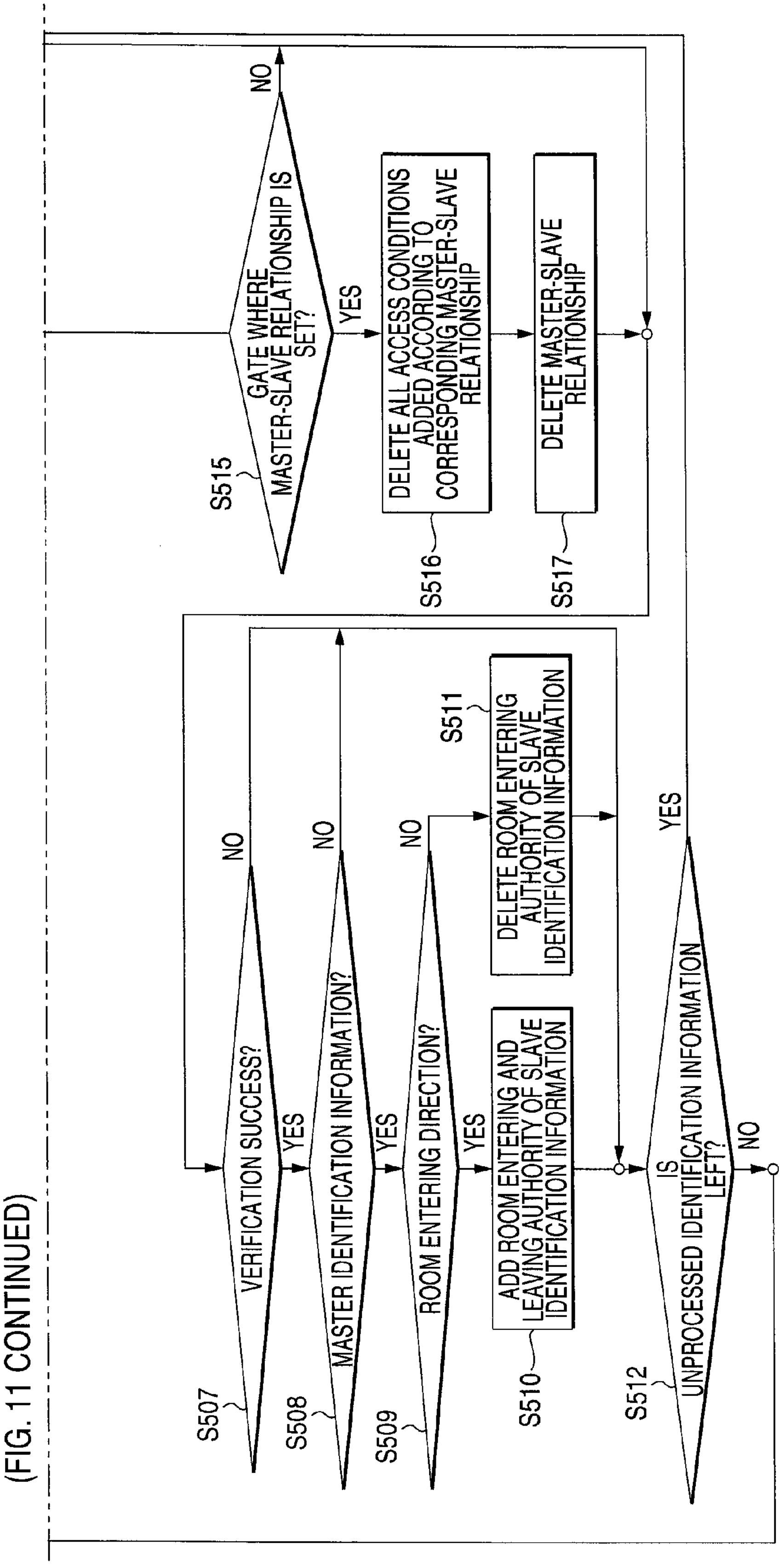

ACCESS CONTROL DEVICE

TECHNICAL FIELD

This invention relates to an access control apparatus for using personal identification information recorded on an IC card, etc., to control access of the person to space and a machine

BACKGROUND ART

In recent years, customer information outflow in enterprises has introduced a social problem and to enhance information security management, a large number of access control apparatus such as a room entering and leaving management apparatus using an IC card have been introduced, as disclosed in patent document 1, etc.

An access control apparatus in a related art will be discussed with FIG. 12. FIG. 12 is a block diagram to show the configuration of an access control apparatus.

The access control apparatus in the related art is made up of identification information storage means 101 of an IC card, etc., for storing identification information to identify each person, identification information acquisition means 102 of an IC card reader, etc., for reading the identification information, installed in the vicinity of a gate for restricting access, access condition record means 103 for recording the access condition of each piece of identification information to the gate, verification means 104 for making a comparison between the acquired identification information and the access condition and determining whether or not the user can access the gate, and access control means 105 for controlling the lock state of the gate in response to the verification result.

The user carries the identification information storage means 101 and presents the identification information storage means 101 to the identification information acquisition means 102 when passing through the gate.

The identification information acquisition means 102 transmits the acquired identification information and the gate number where the identification information acquisition means 102 is installed to the verification means 104.

The verification means 104 references the access condition record means 103 and determines whether or not the pair of the received identification information and gate number satisfies the access condition and if the access condition is satisfied, the verification means 104 instructs the access control means 105 to unlock the corresponding gate.

The access control means 105 unlocks the gate, enabling the user to pass through the gate.

If the access condition is not satisfied, the verification means 104 does not unlock the gate, prohibiting the user from passing through the gate.

In the access control apparatus in the related art, the manager needs to manually register the access condition of each user in the access condition record means 103, and several methods for facilitating registration work are proposed.

For example, in an access control apparatus disclosed in patent document 2 wherein identification information is grouped for management and an access condition is set for each group, when a user is added or user's organization is changed, etc., the access condition can be changed by changing only the group information of the group to which the user belongs.

In an access control apparatus disclosed in patent document 3 wherein an exceptional access condition is recorded in identification information acquisition means 102, verification means 104 also verifies the access condition recorded in identification information storage means 101, whereby the access condition can be changed simply by operating the identification information acquisition means 102 without changing the contents of access condition record means 3103.

Patent document 1: JP-A-5-263558

Patent document 2: JP-A-6-185249

Patent document 3: JP-A-11-232514

DISCLOSURE OF THE INVENTION

Problems to be Solved by the Invention

In the access control apparatus in the related art, if a temporary user such as a visitor occurs, complicated work of previously checking the move route of the visitor, recording an access condition in the access condition record means 103 or the identification information storage means 101, etc., is required.

Whenever the access condition is changed accompanying change of a conference room or prolongation of the conference time, it is also necessary to inform the system administrator managing the access condition, and the management job is intricate.

To set a flexible access condition such that the visit destination is changed in response to the descriptions and the result of a business talk, visitor cards of visitors that can access all gates where the visitors may visit are provided and the security level for the visitors become lower; this is a problem.

Means For Solving the Problems

To solve the problems described above, an access control apparatus of the invention includes access condition update means for setting a master-slave relationship between or among two or more pieces of identification information and dynamically changing the access condition of slave identification information carried by a visitor in response to the verification result of master identification information carried by a guide.

According to the configuration described above, the access condition update means permits the visitor having the slave identification information to access the gate verified by the guide having the master identification information, whereby if the visitor and the guide move together, the visitor is enabled to pass through the gate which the guide passes and intricate work of previously setting the visit destination of the visitor is not required.

When both the identification information having the access permission and the identification information having no access permission make a room entering request at the same time, the access condition update means sets the master-slave relationship for two or more pieces of the identification information. Thereby, the visitor is made to carry identification information storage means 101 storing identification information having no access permission to any gate so that it is made possible for the visitor to accompany the guide and any setting work about relationship between the guide and the visitor is not required before the visitor comes.

When the guiding terminates and the guide having the master identification information and the visitor exit through the gate where the master-slave relationship is set, the access condition update means releases the master-slave relationship with the slave identification information, whereby it becomes impossible for the visitor to enter through the gate after the guiding terminates again, and it is made possible to maintain the security level.

When the guide having the master identification information exits through the gate where the master-slave relationship is set, the access condition update means releases the master-slave relationship with the slave identification information, whereby when the guide loses track of the visitor, etc., it is made possible for the guide to release the master-slave relationship of his or her own will and it becomes impossible for the visitor to move through the gate freely, so that it is made possible to maintain the security level.

When the master-slave relationship is released, the access condition changed with that master-slave relationship is returned to beginning condition, whereby the visitor can be prevented from moving through the gate after the guiding terminates.

The access condition of the slave identification information is added to the gate through which the guide having the master identification information enters, whereby it is made possible for the visitor to pass through the gate which the guide enters, a visitor card for permitting access to a plurality of gates need not be created, and the security level can be maintained.

The access condition of the slave identification information is deleted from the gate through which the guide having the master identification information exits, whereby it becomes impossible for the visitor to access the gate where the guiding terminates, and the security level can be maintained.

Advantages of the Invention

According to the invention, the master-slave relationship is set between or among two or more pieces of identification information and the access condition of the slave identification information is dynamically changed in response to the access result of the master identification information to a gate, whereby intricate access condition management is not required and the security level can be maintained even in an environment wherein a large number of temporary users of visitors, etc., exist.

BRIEF DESCRIPTION OF THE DRAWINGS

FIG. 6 is a drawing to show an example of the master-slave relationship database to which a master-slave relationship is added in the first embodiment.

FIG. 7 is a drawing to show the access conditions after an access condition is added in the first embodiment.

FIG. 8 is a drawing to show the access conditions after an access condition is added in the first embodiment.

FIG. 9 is a drawing to show the access conditions after some room entering condition is deleted in the first embodiment.

FIG. 10 is a drawing to show the access conditions after some access conditions are deleted in the first embodiment.

DESCRIPTION OF REFERENCE NUMERALS

Figures 1, 2:
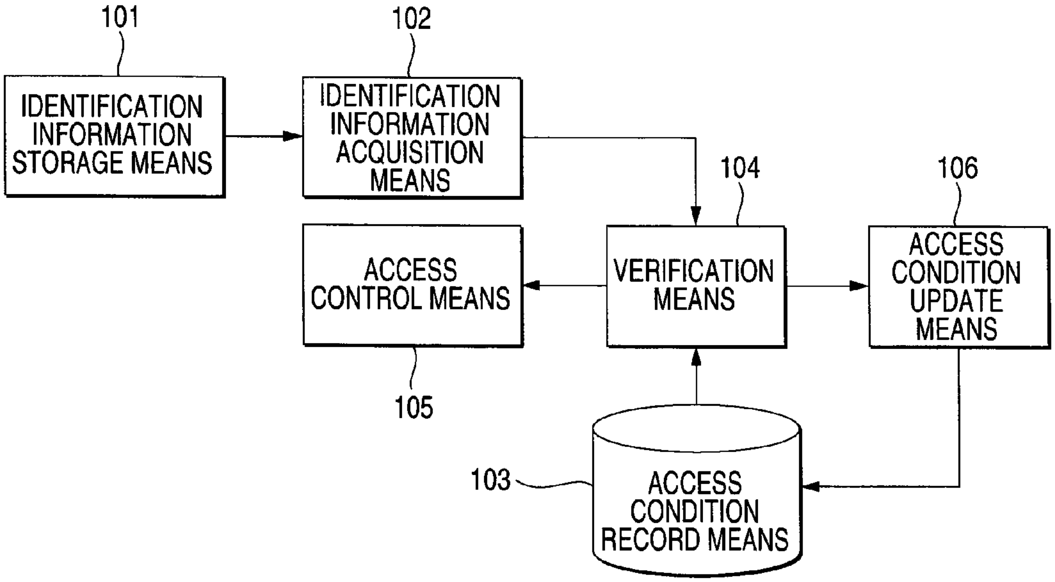
FIG. 1 is a diagram to show the configuration of an access control apparatus in a first embodiment.
FIG. 2 is a drawing to show an example of the access condition recorded by access condition record means 103 in the first embodiment.

101 Identification information storage means
102 Identification information acquisition means
103 Access condition storage means
104 Verification means
105 Access control means
106 Access condition update means

BEST MODE FOR CARRYING OUT THE INVENTION

Embodiments of access control apparatus of the invention will be discussed in detail with reference to the accompanying drawings. Parts having the same function are denoted by the same reference numeral throughout the drawings to describe the embodiments and will not repeatedly be discussed.

(First Embodiment)

Disclosed in a first embodiment is an access control apparatus for eliminating the need for intricate access condition management for a visitor by setting the master-slave relationship between or among two or more pieces of identification information and dynamically changing the access condition of slave identification information in response to the access result of master identification information to a gate.

FIG. 1 is a diagram to show the configuration of the access control apparatus of the first embodiment.

The access control apparatus includes identification information storage means 101, identification information acquisition means 102, access condition record means 103, verification means 104, access control means 105, and access condition update means 106. One or more identification information storage means 101, one or more identification information acquisition means 102, and one or more access control means 105 are included. As the identification information storage means 101, an IC card for storing identification information of the user can be named as an example.

As the identification information, a different symbol for each user is assigned by the manager to uniquely identify the user.

The identification information acquisition means 102 is an IC card reader for acquiring the identification information in an IC card.

The identification information acquisition means 102 is installed in a gate for managing access. In a gate for managing only room entering, one identification information acquisition means 102 is installed at the entrance; in a gate for managing both room entering and room leaving, one identification information acquisition means 102 is installed at the entrance and another one is installed at the exit.

To manage access to one or more gates, one or two identification information acquisition means 102 are installed at each gate and the identification information acquisition means 102 are connected to the verification means 104 through a network.

For each gate, the gate number for making it possible to uniquely identify the gate is set. If the identification information acquisition means 102 acquires identification information from the identification information storage means 101, it creates a verification request made up of a set of the identification information, the gate number, and the access direction and transmits the verification request to the verification means 104.

The access direction is information indicating the room entering direction or the room leaving direction. If the identification information acquisition means 102 acquires two or more pieces of identification information in a short time, it determines that room entering requests occurred at the same time, and creates a verification request containing a plurality of pieces of identification information and transmits the verification request to the verification means 104.

The access condition record means 103 is a database for recording the access condition of each piece of identification information to each gate.

The database is made up of a set of a gate number, identification information, a room entering flag, a room leaving flag, and a relation number.

The room entering flag and the room leaving flag indicate whether or not room entering and room leaving are permitted respectively. The relation number is an item set in the access condition added by the access condition update means 106, and indicates which master-slave relationship the access condition is added according to.

The relation number does not exist in the access conditions preset by the system manager and becomes blank.

FIG. 2 shows an example of the access condition recorded by the access condition record means 103.

FIG. 2 indicates that the users with identification information 1, 2, and 3 can enter and exit through the No. 0 gate and that the users with identification information 1 and 2 can enter and exit through the No. 1 gate.

Therefore, the user with identification information 3 can enter and exit through the No. 0 gate, but cannot enter or exit through the No. 1 gate.

The verification means 104 verifies whether or not the verification request created by the identification information acquisition means 102 is contained in the access conditions recorded in the access condition record means 103.

Figures 3, 4:
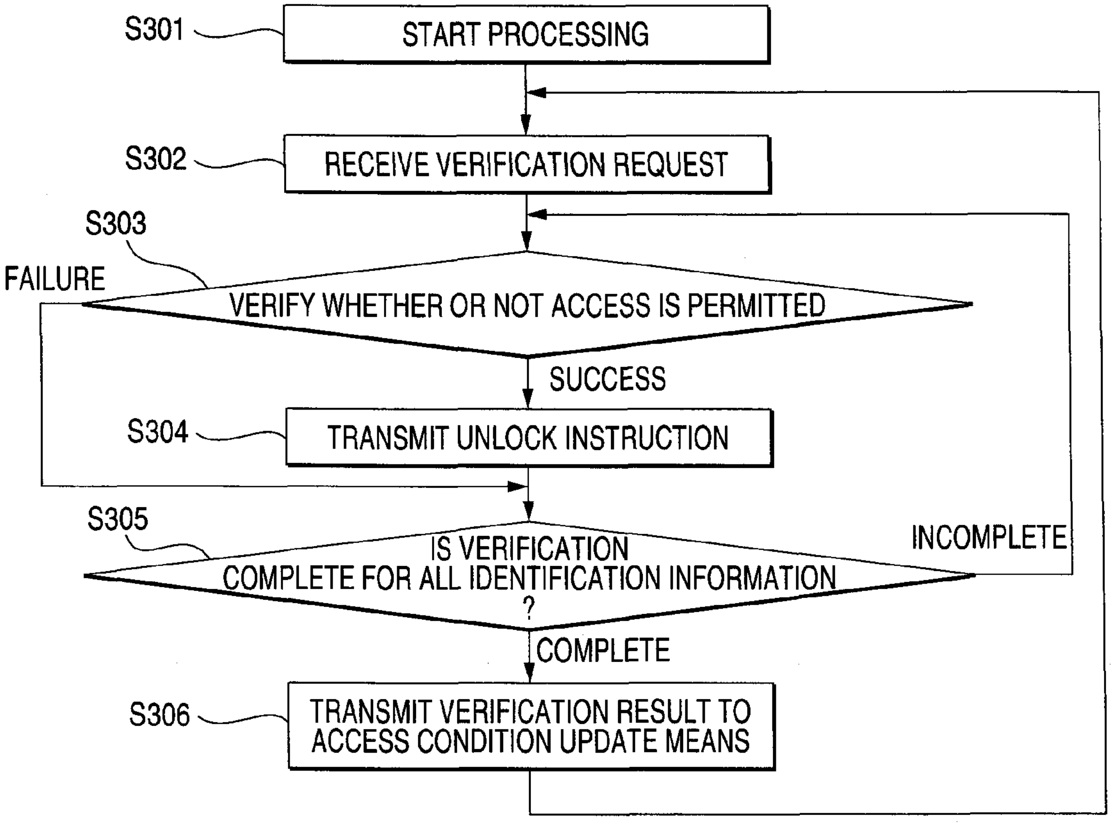
FIG. 3 is an operation flowchart of verification means 104 in the first embodiment.
FIG. 4 is a drawing to show an example of a master-slave relationship database in the first embodiment.

FIG. 3 shows an operation flow of the verification means 104.

When the verification means 104 starts processing (step S301), it waits until reception of a verification request transmitted by the identification information acquisition means 102 (step S302). Upon reception of a verification request, the verification means 104 makes a comparison between the database in the access condition record means 103 and the verification request to verify whether or not access is permitted (step S303). In the verification processing, if the access condition for a pair of the gate and the identification information contained in the verification request exists in the database and the permission in the access direction contained in the verification request is described as OK in the room entering flag or the room leaving flag, the verification results in success. If the verification results in success, an unlock instruction is transmitted to the access control means 105 corresponding to the gate number (step S304). If the verification request contains two or more pieces of identification information (incomplete at step S305), the verification processing (step S303) is repeated for all identification information. Upon completion of the processing of all identification information (complete at step S305), the verification result is transmitted to the access condition update means 106. The verification result is made up of the gate number, the access direction, one or more pieces of identification information, and verification success or failure for each piece of identification information. When transmitting the verification result, again the identification information acquisition means 102 waits until reception of a verification request (step S302).

The access control means 105 is installed for each gate for managing access and is connected to the verification means 104 through the network. Upon reception of the unlock instruction, the access control means 105 unlocks the gate. The access control means 105 locks the gate when a given time has elapsed since the gate was unlocked or if passage of the user through the gate is detected with a sensor or door opening and closing operation.

The access condition update means 106 updates the access condition recorded in the access condition record means 103 in accordance with the verification result received from the verification means 104.

The access condition update means 106 retains an internal master-slave relationship database.

FIG. 4 shows an example of the master-slave relationship database.

The master-slave relationship database is made up of the relation number, master identification information, slave identification information, and the setup gate number.

The relation number is an ID for making it possible to uniquely identify the master-slave relationship. The setup gate number is the gate number verified when the master-slave relationship is set.

FIG. 4 indicates that the master-slave relationship is set in a pair of master identification information 0 and slave identification information 10 and a pair of master identification information 1 and slave identification information 12.

Figure 5:
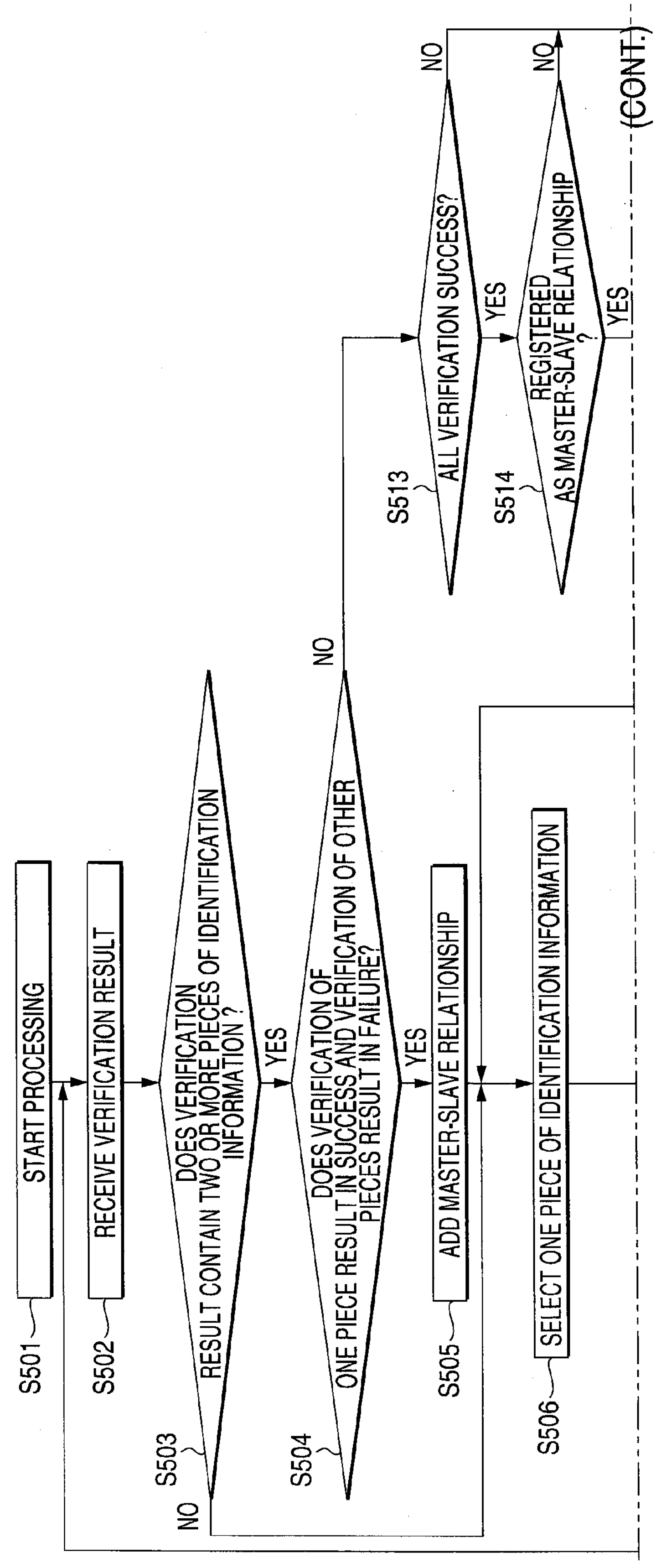
FIG. 5 is an operation flowchart of access condition update means 106 in the first embodiment.

FIG. 5 shows an operation flow of the access condition update means 106.

When the access condition update means 106 starts processing (step S501), it waits until reception of the verification result from the verification means 104 (step S502). Upon reception of the verification result, whether or not the verification result contains two or more pieces of identification information is checked (step S503). If the verification result contains two or more pieces of identification information (YES at step S503), whether or not verification of one piece of identification information results in success and verification of other pieces of identification information results in failure is checked (step S504) and if so (YES at step S504), a new master-slave relationship is added to the master-slave relationship database (step S505). The new master-slave relationship is added to the master-slave relationship database with the identification information whose verification results in success set as master identification information, the identification information whose verification results in failure as slave identification information, and the verification gate number as the setup gate number. If the verification result contains three or more pieces of identification information, the master-slave relationship is generated for the identification information whose verification results in success and each piece of identification information whose verification results in failure. For example, if identification information 1 results in success and identification information 2 and identification information 3 result in failure, two master-slave relationships of the master-slave relationship between master identification information 1 and slave identification information 2 and the master-slave relationship between master identification information 1 and slave identification 3 are added.

Next, access condition update processing of the access condition update means 106 will be discussed.

One piece of identification information is selected from among the pieces of identification information contained in the verification result (step S506) and if verification of the selected identification information results in success (YES at step S507) and the identification information is registered as the master identification information in the master-slave relationship database (YES at step S508), the access condition for the slave identification information having the master-slave relationship with the master identification information is updated.

If the verification result of the master identification information is the room entering direction (YES at step S509), as the access condition of the slave identification information to the verification gate, the access condition with the room entering flag and the room leaving flag set to OK and the relation number being the master-slave relationship number is added (step S510).

If the verification result of the master identification information is the room leaving direction (NO at step S509), the room entering flag of the access condition of the slave identification information to the verification gate is changed to NG and the room entering permission is deleted (step S511).

The described access condition update processing is executed for all identification information contained in the verification result. Whether or not the verification result contains any piece of unprocessed identification information is checked (step S512). If any piece of unprocessed identification information is contained (YES at step S512), step S506 and the later steps are repeated.

When the processing is complete for all identification information contained in the verification result (NO at step S512), the access condition update means 106 waits until reception of a new verification result (step S502).

Next, master-slave relationship deletion processing of the access condition update means 106 will be discussed. If the verification result contains two or more pieces of identification information (YES at step S503) and verification of all identification information results in success (YES at step S513), the master-slave relationship deletion processing is executed.

First, whether or not a pair of pieces of identification information contained in the verification result is registered in the master-slave relationship database is checked (step S514). If a pair is registered (YES at step S514), whether or not the setup gate number setting the master-slave relationship and the verification gate number are identical is checked (step S515). If the two gate numbers are identical (YES at step S515), all access conditions added according to the corresponding master-slave relationship are deleted from the access condition record means 103 (step S516). Last, the master-slave relationship is deleted from the master-slave relationship database (step S517).

Next, an operation example of the access control apparatus of the embodiment will be discussed.

In the initial state, the system manager registers the access conditions shown in FIG. 2 in the access condition record means 103.

Access to the two gates of gate numbers 0 and 1 is managed and the three users of identification information 1, 2, and 3 can enter and leave through the No. 0 gate and the users of identification information 1 and 2 can enter and leave through the No. 1 gate.

In the initial state, the master-slave relationship does not exist and no data is entered in the master-slave relationship database of the access condition update means 106.

First, the operation of setting the master-slave relationship for a visitor and a guide will be discussed. The visitor carries identification information storage means storing identification information 10 and the user of identification information 1 is the guide for guiding the visitor.

To begin with, the guide and the visitor present the identification information storage means at the same time to the identification information acquisition means 102 installed on the room entering side of the No. 0 gate for making a verification request.

The identification information acquisition means 102 on the room entering side of the No. 0 gate transmits a verification request of the identification information 1 and the identification information 10 to the verification means 104.

The verification means 104 receives the verification request according to the operation flow shown in FIG. 3 (step S302) and first verifies the access condition of the identification information 1. The verification means 104 references the access condition record means 103 and checks that the identification information 1 involves the room entering permission through the No. 0 gate (success at step S303) and transmits an unlock instruction to the access control means 105 at the No. 0 gate (step S306). Upon reception of the unlock instruction, the access control means 105 unlocks the gate, enabling the visitor and the guide to pass through the gate.

Next, the verification means 104 verifies the access condition of the identification information 10 (step S303). Since no access condition is set in the identification information 10, the verification results in failure (failure at step S303). Since verification of all identification information contained in the verification request is processed (complete at step S305), the verification result is transmitted to the access condition update means 106 (step S306).

The access condition update means 106 operates according to the operation flow in FIG. 5. First, the verification result is received (step S502). The verification result contains two pieces of identification information (YES at step S503) and verification of the identification information 1 results in success and verification of the identification information 10 results in failure (YES at step S504). Thus, a new master-slave relationship is added to the master-slave relationship database (step S505).

FIG. 6 shows the master-slave relationship database to which the master-slave relationship is added.

The added master-slave relationship is the relation number 1, the master identification information is the identification information 1 whose verification results in success, the slave identification information is the identification information 10 whose verification results in failure, and the setup gate number is the verification gate number 0.

Thus, the visitor and the guide make a room entering request at the same time, whereby automatically the master-slave relationship is set for both the visitor and the guide.

Next, an operation example of adding an access condition will be discussed. After adding the master-slave relationship, the access condition update means 106 selects the identification information 1 (step S505) and checks whether or not access condition update is required. Verification of the identification information 1 results in success (YES at step S507) and when the master-slave relationship database in FIG. 6 is referenced, it is seen that the identification information 1 is the master identification information of the relation number 1 (YES at step S508). Further, since the verification result is the room entering direction (YES at step S509), a room entering and leaving condition through the No. 0 gate is added to the identification information 10 of the slave identification information of the relation number 1.

FIG. 7 is a drawing to show the access condition added by the access condition record means 103.

The access condition of the identification information 10 to enter and exit through the NO. 0 gate according to the master-slave relationship 1 is added to the tail end of FIG. 7.

Thus, when the master-slave relationship is set for the visitor and the guide, the access condition of entering and exiting through the gate with the master-slave relationship set for the slave identification information of the visitor is added and later the visitor is enabled to pass through the gate freely.

Next, the access condition update means 106 checks whether or not it is necessary to update the access condition for the identification information 10 contained in the verification result. Since verification of the identification information 10 does not result in success (NO at step S507), the access condition is not updated. Since all identification information has been processed (NO at step S512), the access condition update means 106 waits until reception of a new verification result (step S502).

Next, an operation example when the guide enters through the No. 1 gate will be discussed.

To enter through the No. 1 gate, the guide presents the identification information storage means 101 to the identification information acquisition means 102.

The identification information acquisition means 102 transmits a verification request of the identification information 1 to the verification means 104.

The verification means 104 checks that the room entering condition of the identification information 1 through the No. 1 gate is recorded in the access condition record means 103 (success at step S303 in FIG. 3) and the No. 1 gate is unlocked and thus the guide can enter through the No. 1 gate.

The verification means 104 transmits the verification result to the access condition update means 106 (step S306). The access condition update means 106 receives the verification result (step S502) and since the verification result contains only one piece of identification information, whether or not the access condition needs to be updated is checked (NO at step S503). Since the verification result contains only one piece of identification information, the identification information 1 is selected (step S506). Verification of the identification information 1 results in success (YES at step S507) and it is seen that the identification information 1 is the master identification information of the relation number 1 according to the master-slave relationship database (YES at step S508) and thus the access condition is updated.

Since it is seen from the verification result that the verification is the room entering direction (YES at step S509), the room entering and leaving permission through the No. 1 gate is added to the identification information 10 of the slave identification information of the relation number 1.

FIG. 8 is a drawing to show the access condition added by the access condition record means 103.

The access condition of the identification information 10 to enter and exit through the NO. 1 gate according to the master-slave relationship 1 is added to the tail end of FIG. 8.

Next, when the identification information 10 is verified for the visitor of the identification information 10 to enter through the NO. 1 gate following the guide, the access condition to the NO. 1 gate for the identification information 10 is registered in the access condition record means 103 and thus the visitor can enter through the NO. 1 gate.

Thus, if the master-slave relationship is set for the visitor and the guide, it is made possible for the visitor to enter through the gate through which the guide enters.

If the visitor attempts to enter through the NO. 1 gate before the guide enters through the NO. 1 gate, the access conditions before the guide enters through the NO. 1 gate do not contain the access condition of the identification information 10 to the NO. 1 gate as in FIG. 7 and therefore lowering of the security level as the visitor moves to a place where the guide does not accompany the visitor is prevented.

Next, an operation example when the guide exits through the NO. 1 gate will be discussed. When the guide presents the identification information storage means 101 to the identification information acquisition means 102 to exit through the NO. 1 gate, verification results in success in the verification means 104 and the verification result is transmitted to the access condition update means 106.

Since verification of the identification information contained in the verification result results in success and the identification information is the master identification information, the access condition update means 106 updates the access condition. Since the verification result is the room leaving direction (NO at step S509), the room entering condition of the slave identification information is deleted (step S511).

FIG. 9 is a drawing to show the access conditions after some room entering condition is deleted by the access condition record means 103.

For the access condition of the identification information 10 to the NO. 1 gate at the tail end of FIG. 9, the room entering flag is changed from OK to NG and the person of the slave identification information 10 cannot enter through the NO. 1 gate.

The visitor exits through the NO. 1 gate following the guide. Since the room leaving condition through the NO. 1 gate is not deleted from the access condition described in FIG. 9, verification results in success and the visitor can exit through the NO. 1 gate.

In this state, if the visitor attempts to again pass through the NO. 1 gate, the room entering flag of the identification information 10 for the gate number 1 is NG and therefore verification results in failure and the visitor cannot enter.

Thus, if the master-slave relationship is set for the visitor and the guide, the visitor can exit through the gate through which the guide exits, but it becomes impossible for the visitor to again enter through the gate and lowering of the security level as the visitor moves to a place where the guide does not accompany the visitor is prevented.

Last, an example wherein the guide exits through the NO. 0 gate together with the visitor is shown.

The guide and the visitor present the identification information storage means 101 at the same time to the identification information acquisition means 102 at the No. 0 gate and verification is conducted for the guide and the visitor to exit through the No. 0 gate.

In the access conditions in FIG. 9, the access condition to the No. 0 gate permits the persons of the identification information 1 and 10 to exit and thus the verification results in success and the verification result is transmitted to the access condition update means 106.

Since the verification result contains two or more pieces of identification information (YES at step S503) and the verification result is all success (NO at step S504 and YES at step S513), the access condition update means 106 executes release processing of the master-slave relationship.

Since the identification information 1 and the identification information 10 are registered in the master-slave relationship 1 (YES at step S514) and the verification gate at the same time is the gate number 0 setting the master-slave relationship (YES at step S515), all access conditions added according to the master-slave relationship 1 are deleted (step S516).

FIG. 10 is a drawing to show the access conditions after some access conditions are deleted by the access condition record means 103.

It is seen that the two access conditions registered according to the master-slave relationship 1 in FIG. 9 are deleted and the state is restored to the state in FIG. 2, the initial state of the access conditions. The access condition update means 106 last deletes the master-slave relationship from the master-slave relationship database (step S5 17).

When the master-slave relationship 1 is deleted, the master-slave relationship database becomes empty as in the initial state.

Thus, when the master-slave relationship is set for the visitor and the guide, if both the visitor and the guide exit at the same time through the gate where the master-slave relationship is set, access conditions added in the setting are all deleted and the master-slave relationship is released. Later, if the guide moves anywhere, the access condition for the visitor is not changed because the master-slave relationship does not exist, so that the visitor cannot enter through any gate.

In the embodiment, the master-slave relationship is set dynamically as the visitor and the guide are verified at the same time, but the master-slave relationship may be previously registered in the master-slave relationship database of the access condition update means 106. The guide carries the identification information storage means 101 storing the master identification information and the visitor carries the identification information storage means 101 storing the slave identification information, so that the visitor can be guided with the security maintained without setting the access condition for each gate by the system manager.

In the embodiment, for the gate through which the person of the master identification information enters, the room entering and leaving permission is added to the slave identification information and for the gate through which the person of the master identification information exits, the room entering permission of the slave identification information is deleted. However, for the gate through which the person of the master identification information enters, only the room entering permission may be added to the slave identification information and for the gate through which the person of the master identification information exits, the room entering permission may be deleted from the slave identification information and the room leaving permission may be added.

Thus, since the visitor is not granted the room leaving authority through gate unless the guide exits, the visitor and the guide always exist in the same space and a higher security level can be maintained.

(Second Embodiment)

In the first embodiment, if persons of two or more pieces of identification information for which the master-slave relationship is set exit at the same time, the master-slave relationship is deleted. In a second embodiment, however, if only the person of the master identification information exits through a gate where the master-slave relationship is set, the master-slave relationship may be deleted.

Figure 11:
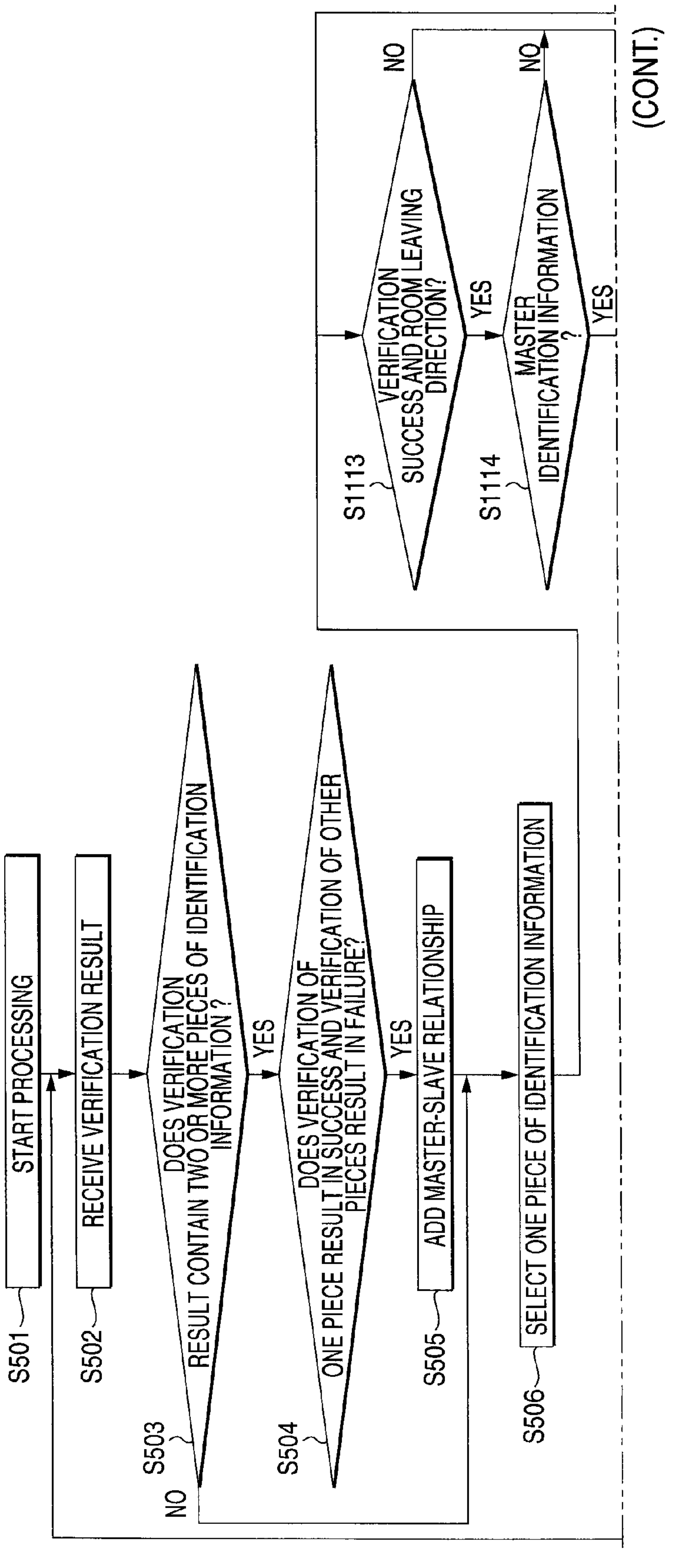
FIG. 11 is a flowchart to show the operation of access condition update means 106 in a second embodiment.
Figure 12:
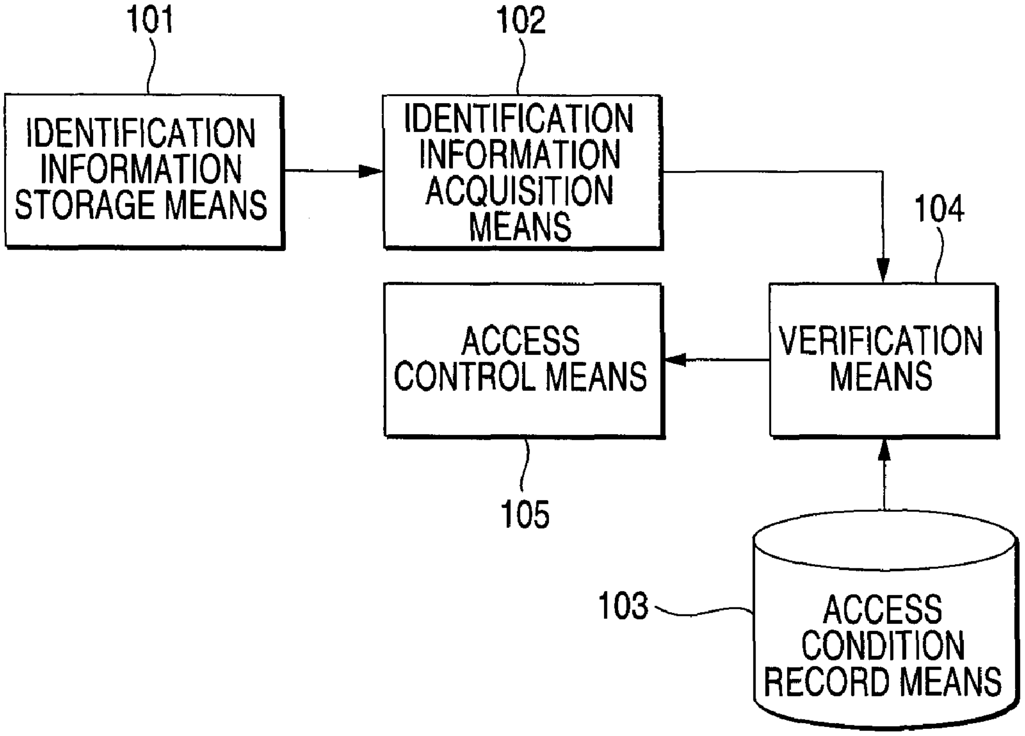
FIG. 12 is a diagram to show the configuration of an access control apparatus in a related art.

FIG. 11 shows an operation flow of access condition update means 106 in the second embodiment. The operation flow in FIG. 11 is similar to the operation flow in FIG. 5 and therefore only the differences will be discussed.

The master-slave relationship deletion processing at steps S513 to S517 in FIG. 5 is executed before the access condition update processing at step S506. In the master-slave relationship deletion processing, first whether or not the verification result is verification success and the room leaving direction is checked (step S113). Next, whether or not the identification information whose verification results in success is registered in a master-slave relationship database as master identification information is checked (step S14) and further whether or not the verification gate is a gate where the master-slave relationship is set is checked (step S515). If the condition is satisfied (YES at step S515), slave relationship deletion processing (steps S516 and S517) are executed and then access condition update processing at step S507 and the later steps is executed as in the first embodiment described above.

An operation example wherein a guide exits through gate 0 in a state in which the master-slave relationship as in FIG. 6 is set is shown below:

If verification for the guide to exit is conducted, verification of the gate number 0 results in success and the verification result is transmitted to the access condition update means 106.

The access condition update means 106 determines that the person of master identification information exits through the gate where the master-slave relationship is set (YES at step S515 in FIG. 11) and executes the master-slave relationship deletion processing, thereby deleting all access conditions added according to the master-slave relationship to which the master identification information belongs and deleting the master-slave relationship from the master-slave relationship database.

Thus, if a visitor does not exist, it is made possible for the user of the master identification information to delete the master-slave relationship solely and if the guide loses track of a visitor, etc., lowering of the security level as the visitor moves accidentally can be prevented.

In the embodiments, the unique symbol assigned to the user, recorded on an IC card is used as the identification information, but biometric information of iris, fingerprint, vein image, face image, etc., may be used.

In this case, the identification information storage means 101 is the user and the identification information acquisition means is a biometric information reader such as a camera or a senor to make up an access control apparatus, whereby advantages similar to those of the embodiments can be provided.

While the invention has been described in detail with reference to the specific embodiments, it will be obvious to those skilled in the art that various changes and modifications can be made without departing from the spirit and the scope of the invention.

This application is based on Japanese Patent Application (No. 2005-063310) filed on Mar. 8, 2005, which is incorporated herein by reference.

Industrial Applicability

The access control apparatus according to the preferred embodiments of the invention is useful as a room entering and leaving management apparatus, etc., for lessening the occasions of invading a place where no entry is permitted without setting any separate access condition for a temporary user of a visitor, etc.

The invention claimed is:

1. An access control apparatus for controlling whether to permit an access to a premises in accordance with a plurality of pieces of identification information stored in a plurality of identification information storage means, respectively, said access control apparatus comprising:

access condition record means for recording an access condition indicating identification information which permits the access to the premises;

verification means for checking a plurality of pieces of identification information respectively associated with disparate users, which are individually obtained within a predetermined time, as a single access request, against the access condition; and access condition update means for evaluating a verification result of the verification means and, if the plurality of pieces of identification obtained include first identification information, associated with a first person with access to the premises, which is verified as included in the access condition and second identification information, associated with a second person without access to the premises, which is verified as not included in the access condition, for updating the access condition, wherein the access condition update means is configured for setting a master-slave relationship between the first identification information and second identification information, and changing the access condition of the second identification information carried by the second person to the access condition of the identification of the first person in response to the verification result of first identification information carried by a first person.

2. The access control apparatus according to claim 1, wherein the access condition update means updates the access condition by creating a relation number which is assigned to an association between the first identification information and the second identification information and records the second identification information along with the relation number.

3. The access control apparatus according to claim 1, wherein, if all of the plurality of pieces of identification information obtained are verified as included in the access condition, the access condition update means updates the access condition so as to delete the second identification information indicated in the access condition.

4. The access control apparatus according to claim 1, wherein, if the first identification information obtained within the predetermined time as the access request is checked against the access condition, the access condition update means updates the access condition so as to delete third identification information which is recorded in association with the first identification information but is not obtained within the predetermined time as the access request.

5. An access control method for controlling whether to permit an access to a premises in accordance with a plurality of pieces of identification information stored in a plurality of identification information storage means, respectively, said access control method comprising:

recording an access condition indicating identification information which permits the access to the premises, by access condition record means;

checking a plurality of pieces of identification information respectively associated with disparate users which are individually obtained within a predetermined time, as a single access request, against the access condition, by verification means; and evaluating a verification result of the verification means and, if the plurality pieces of identification information obtained include first identification information, associated with a first person with access to the premises, which verified as included in the access condition and second identification information, associated with a second person without access to the premises, which is verified as not included in the access condition, updating the access condition by access condition update means, wherein the access condition update means is configured for setting a master-slave relationship between the first identification information and second identification information, and changing the access condition of the second identification information carried by the second person to the access condition of the identification of the first person in response to the verification result of first identification information carried by a first person.

* * * * *